Oct. 8, 1940.   R. A. BAUDRY   2,217,431
TOTALLY ENCLOSED DYNAMOELECTRIC MACHINE
Filed June 28, 1938
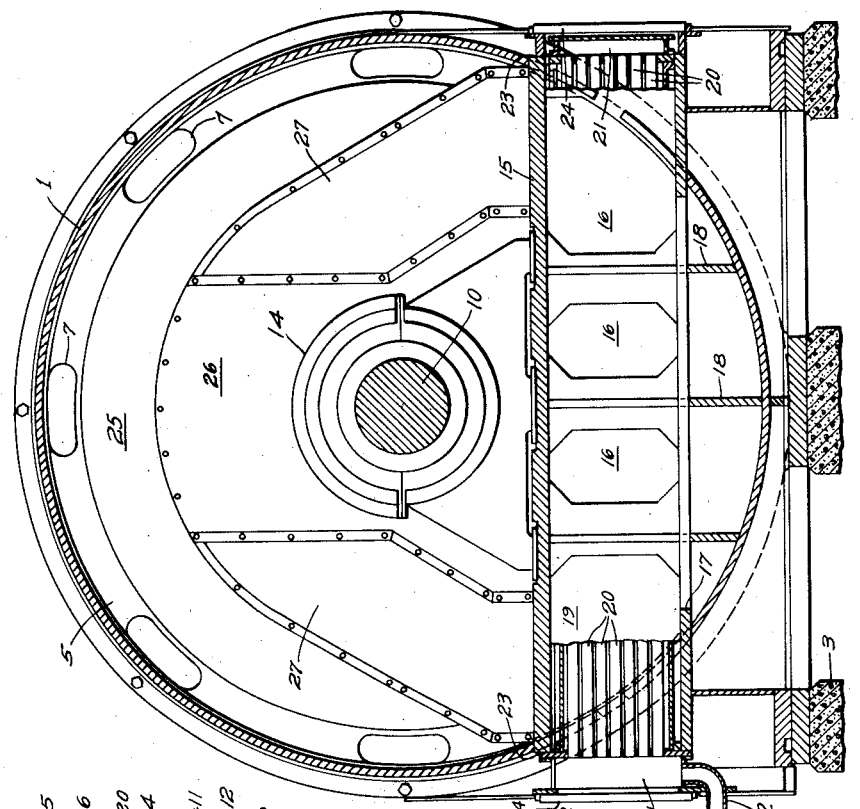
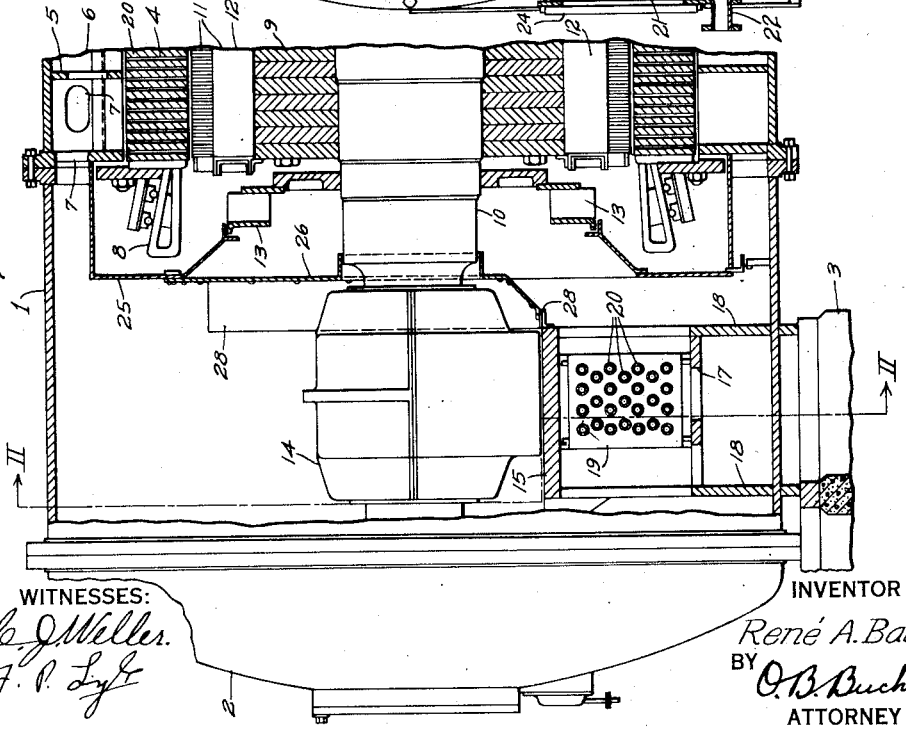
WITNESSES:
C. J. Weller.
F. P. Ly...
INVENTOR
René A. Baudry.
BY O. B. Buchanan
ATTORNEY Patented Oct. 8, 1940

2,217,431

UNITED STATES PATENT OFFICE 2,217,431

TOTALLY ENCLOSED DYNAMOELECTRIC MACHINE

René A. Baudry, Pittsburgh, Pa., assignor to Westinghouse Electric & Manufacturing Company, East Pittsburgh, Pa., a corporation of Pennsylvania Application June 28, 1938, Serial No. 216,234

10 Claims. (Cl. 171—252)

The present invention relates to large, totally enclosed dynamoelectric machines, and, more particularly, to the ventilation of such machines.

Dynamoelectric machines of large size, such as synchronous generators and synchronous condensers, usually operate at speeds ranging from 600 to as high as 3600 revolutions per minute, and because of this high speed special attention must be given to the ventilation of these machines in order to obtain the greatest possible output. In many cases, it is necessary or desirable to use a more efficient cooling medium than air, and in such cases hydrogen is usually used. When hydrogen is used as the cooling medium, the machine must be totally enclosed in a gas-tight housing in order to prevent escape of the gas or its contamination by air, and some means must then be provided to cool the gas within the housing. This is usually done by means of coolers placed inside the housing through which water, or other cooling medium, may be circulated. It is obviously desirable to so arrange these coolers that they will take up as little space in the machine as possible so as not to increase the necessary size of the housing unduly, and also that they should be so arranged that they will be easily accessible for inspection and maintenance.

The object of the present invention is to provide an improved arrangement for cooling and ventilating gas in a large, totally enclosed dynamoelectric machine.

A more specific object is to provide an arrangement of coolers for such machines which will give a very compact construction and will make the coolers easily accessible for inspection and maintenance.

Further objects and advantages will be apparent from the following detailed description taken in connection with the accompanying drawing, in which:

Figure 1 is a partial longitudinal sectional view of a large, totally enclosed dynamoelectric machine; and Fig. 2 is a transverse sectional view taken approximately on the line II—II of Fig. 1.

The invention is shown in the drawing for the purpose of illustration as embodied in a synchronous condenser, and since both ends of the machine are of identical construction, only one end is illustrated and described. This machine is adapted to be cooled by means of hydrogen, or a similar gaseous cooling medium, and is, therefore, completely enclosed by a generally cylindrical gas-tight housing 1, which may, if desired, be formed of several sections bolted or otherwise secured together. The housing is closed at the end by a suitable end head 2 and is supported on a foundation 3.

A stator core 4 of the usual laminated construction, providing radial ventilating ducts, is supported on the interior of the housing by circumferential web members 5 and longitudinal ribs 6 in which openings 7 are formed to permit the flow of hydrogen. Suitable stator windings 8 are placed in slots in the stator core 4. The rotor member of the machine comprises a body portion 9 secured to a shaft 10 and having a plurality of salient pole pieces 11 secured to it, carrying suitable field windings 12. A fan 13 of any suitable type is mounted on the shaft 10 in order to circulate the hydrogen through the machine.

The shaft 10 is supported for rotation in a bearing 14 which rests on a bearing support 15 in the end portion of the housing 1. The bearing support 15 is preferably in the form of a generally rectangular, hollow member which extends transversely across the housing from one side to the other and passes through it at each end, as shown in Fig. 2. The joints between the housing and the bearing support are preferably welded or otherwise made gas-tight. Large openings 16 are formed in the vertical sides of the bearing support and openings 17 are provided in its bottom surfaces. Bracing and supporting members 18 are provided beneath the bearing support 15 to assist in supporting the weight of the bearing and rotor.

A cooler 19 for the hydrogen is mounted in the hollow bearing support, and as shown in Fig. 2, the cooler extends completely through the support from one side of the machine to the other. The cooler is preferably of the usual water-tube type, consisting of a plurality of tubes 20 which extend between headers 21 at opposite ends of the cooler. Water flows in through a connection 22, passes through certain of the tubes to the header 21 at the opposite end, and then returns through the other tubes and is discharged through another similar connection. The cooler extends beyond the ends of the bearing support 15 and is secured to it at each end with a gas-tight connection, as indicated at 23. Suitable covers 24 are provided for the ends of the cooler.

In order to properly direct the flow of hydrogen or other ventilating gas, an inner end bell 25 is secured to the end of the stator member, and extends radially inward to adjacent the fan 13.

An outer end bell is secured to the inner end bell and comprises a baffle member 26 and duct members 27. The baffle member 26 is secured at its upper end to the inner end bell 25 and extends downward around the shaft 10 and is secured at its lower end to the bearing support 15, as indicated at 28. The duct members 27 are secured to each side of the member 26 and their lower ends are secured to the bearing support 15 and extend outwardly to the housing, as clearly shown in Fig. 2. The outer edges of these members are secured to the end bell 25, so that the heated hydrogen discharged from the stator member cannot flow back directly into the machine without passing through the cooler, and the assembly of members 26 and 27 thus forms a duct to direct the cooled gas into the inner end bell.

In operation, the hydrogen blown into the machine by the fan 13 passes around the field poles 11 and through the radial ducts of the stator core 4. The gas then flows axially of the machine through the openings 7 and is discharged into the end portion of the housing 1 and the end head 2. It then flows downward past the bearing and through the cooler 19 in the hollow bearing support, and is drawn by the fan 13 through the duct members 27 and into the inner end bell 25 where it is again blown into the machine.

It will be seen from the above description that a construction has been provided which gives a very compact arrangement of the machine, since the cooler is located within the bearing support. This gives more room inside the housing for the bearing and associated parts, and since the bearing support and bearing are located in the end portion of the housing itself, the overall length of the machine is kept to a minimum. The arrangement of the inner and outer end bells makes it possible to direct the flow of the hydrogen in the desired manner without the necessity of any complicated arrangement of ducts, and accordingly gives a very simple construction. It will also be noted that the cooler is easily accessible for inspection and maintenance since both ends extend outside the housing.

The invention has been described with reference to a synchronous condenser, but it should be understood that it is not so limited in its application and it may be used equally well in connection with other similar machines, such as synchronous generators or frequency changers. Any other suitable gaseous cooling medium may be used instead of hydrogen, if desired.

Although a specific embodiment of the invention has been illustrated and described, it is to be understood that it is not limited to the exact details of construction shown, but that, in its broadest aspects, it includes all equivalent embodiments and modifications which come within the scope of the appended claims.

I claim as my invention:

1. A totally enclosed dynamoelectric machine comprising a stator member and a rotor member, a gas-tight housing enclosing the machine and containing a ventilating gas, a bearing for the rotor member within the housing near the end thereof, a hollow support for said bearing within the housing, and a cooler in the housing for the gas, said cooler being mounted in the support.

2. A totally enclosed dynamoelectric machine comprising a stator member and a rotor member, a gas-tight housing enclosing the machine and containing a ventilating gas, a bearing for the rotor member within the housing near the end thereof, a hollow support for the bearing extending transversely across the housing, and a cooler in the housing for the gas, said cooler being mounted in the support.

3. A totally enclosed dynamoelectric machine comprising a stator member and a rotor member, a gas-tight housing enclosing the machine and containing a ventilating gas, a bearing for the rotor member within the housing near the end thereof, a hollow supporting member for the bearing within the housing, and a cooler for the gas extending transversely across the housing through said supporting member.

4. A totally enclosed dynamoelectric machine comprising a stator member and a rotor member, a gas-tight housing enclosing the machine and containing a ventilating gas, a hollow member extending transversely across the housing near the end thereof, a bearing for the rotor member supported on said hollow member, and a cooler for the gas extending through the hollow member.

5. A totally enclosed dynamoelectric machine comprising a stator member and a rotor member, a gas-tight housing enclosing the machine and containing a ventilating gas, an end head closing the end of the housing, a bearing for the rotor member within the housing near the end thereof, a hollow support for said bearing mounted in the housing, a cooler for the gas mounted in the support, and means for causing the gas to flow from the machine into the end of the housing and then through the cooler and back into the machine.

6. A totally enclosed dynamoelectric machine comprising a stator member and a rotor member, a gas-tight housing enclosing the machine and containing a ventilating gas, an end head closing the end of the housing, a bearing for the rotor member within the housing near the end thereof, a hollow support for the bearing mounted in the housing and extending transversely across it, a cooler for the gas mounted in the support, and means for causing the gas to flow from the machine into the end of the housing and then through the cooler and back into the machine.

7. A totally enclosed dynamoelectric machine comprising a stator member, a rotor member, a gas-tight housing enclosing said members and containing a ventilating gas, a hollow bearing support in the end portion of the housing, a bearing for the rotor member on the support, a cooler for the gas within the support, an end head closing the end of the housing, and means for directing the flow of gas from the machine into the end head and then through the cooler and back into the machine.

8. A totally enclosed dynamoelectric machine comprising a stator member, a rotor member, a gas-tight housing enclosing said members and containing a ventilating gas, a hollow bearing support extending transversely across the housing near its end, a bearing for the rotor member on the support, a cooler for the gas extending across the housing within the hollow bearing support, an end head closing the end of the housing, and means to direct the flow of gas from the machine into the end head and then through the cooler and back into the machine.

9. A totally enclosed dynamoelectric machine having a stator member and a rotor member, a gas-tight housing enclosing the machine and containing a ventilating gas, an end head closing the end of the housing, a hollow bearing support mounted in the housing near the end thereof, a bearing for the rotor member on the bearing support, a cooler for the ventilating gas mounted in the bearing support, said bearing support having openings to permit the gas to flow through it, means for circulating the gas through the machine, and means for directing the flow of gas from the machine into the end of the housing and the end head and then through the cooler and back into the machine.

10. A totally enclosed dynamoelectric machine having a stator member and a rotor member, a gas-tight housing enclosing the machine and containing a ventilating gas, an end head closing the end of the housing, a hollow bearing support mounted in the housing near the end thereof and extending transversely across the housing below the longitudinal axis, a bearing for the rotor member on the bearing support, a cooler for the ventilating gas mounted in the bearing support and extending across the housing, at least one end of the cooler extending outside the housing, said bearing support having openings to permit the gas to flow through it, means for circulating the gas through the machine, and means for directing the flow of gas from the machine into the end of the housing and the end head and then through the cooler and back into the machine.

RENÉ A. BAUDRY.